US006535777B1

(12) United States Patent
Kohler

(10) Patent No.: US 6,535,777 B1
(45) Date of Patent: Mar. 18, 2003

(54) METHOD OF OPERATING A TRANSFER SYSTEM HAVING CARRIERS FOR WORK PIECES

(75) Inventor: Dietmar Kohler, Dornbirn (AT)

(73) Assignee: Heron Sondermaschinen Und Steuerungen GmbH, Lustenau (AT)

( * ) Notice: Subject to any disclaimer, the term of this patent is extended or adjusted under 35 U.S.C. 154(b) by 0 days.

(21) Appl. No.: 09/400,385

(22) Filed: Sep. 22, 1999

Related U.S. Application Data

(63) Continuation-in-part of application No. 09/400,663, filed on Sep. 20, 1999, now abandoned.

(30) Foreign Application Priority Data

Sep. 18, 1998 (DE) .......................................... 193 42 752

(51) Int. Cl.[7] .............................................. G06F 19/00
(52) U.S. Cl. ...................................... 700/112; 700/116
(58) Field of Search .............................. 700/116, 112, 700/113, 115, 117, 180, 71, 46

(56) References Cited

U.S. PATENT DOCUMENTS

| 4,251,957 A | * | 2/1981 | Terahara ................ 414/225.01 |
| 4,831,540 A | * | 5/1989 | Hesser ....................... 700/113 |
| 5,214,588 A | * | 5/1993 | Kaneko et al. ............. 700/113 |
| 5,976,199 A | * | 11/1999 | Wu et al. .................. 29/25.01 |

FOREIGN PATENT DOCUMENTS

| DE | 32 25 576 A1 | 12/1983 |
| DE | 44 15 763 A1 | 11/1995 |
| DE | 44 46 203 A1 | 6/1996 |

* cited by examiner

*Primary Examiner*—Leo Picard
*Assistant Examiner*—Kidest Bahta
(74) *Attorney, Agent, or Firm*—Knobbe, Martens, Olson & Bear, LLP

(57) ABSTRACT

The invention pertains to a method of operating a transfer system with individual workpiece carriers driven so as to be able to travel along a path, wherein the workpiece carriers exchange information wirelessly with at least one data loading station arranged on the path. The invention is distinguished by the fact that each workpiece carrier takes on information intended for it wirelessly from the data-loading station, the information is written into a microprocessor control unit of the workpiece carrier, the written information, together with basic data present in the microprocessor, is converted into a travel and machining program for the workpiece carrier, and the workpiece carrier independently conditions its predetermined travel path on the basis of the travel and machining program, travels to corresponding machining stations and exchanges data with machining and/or positioning stations arranged on the path. Thus the advantage is achieved that a workpiece carrier is equipped with completely autonomous intelligence, which is fed to it essentially from one single data-loading station, preferably by wireless means. This permits an autonomous travel and machining operation for each workpiece carrier.

13 Claims, 3 Drawing Sheets

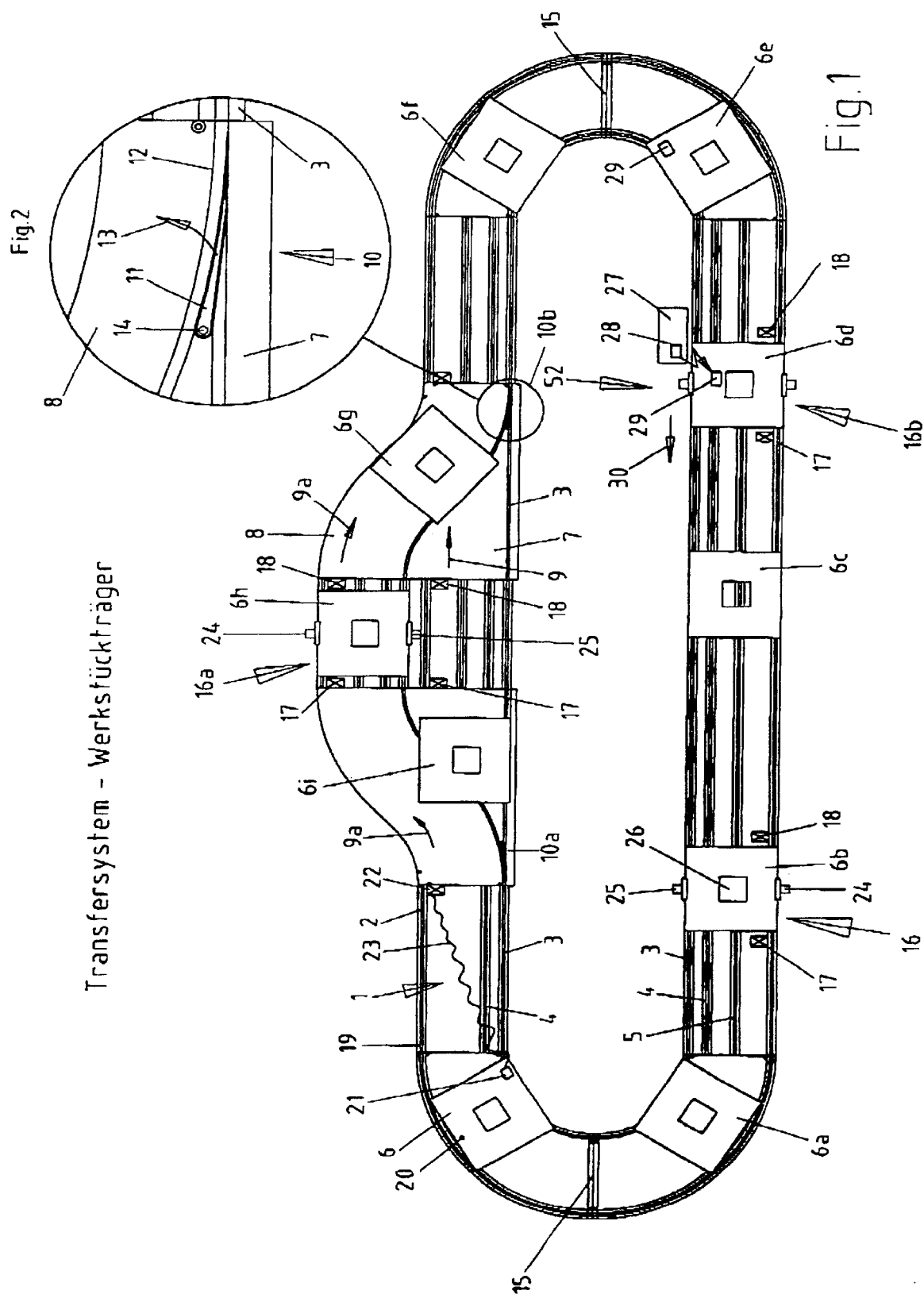

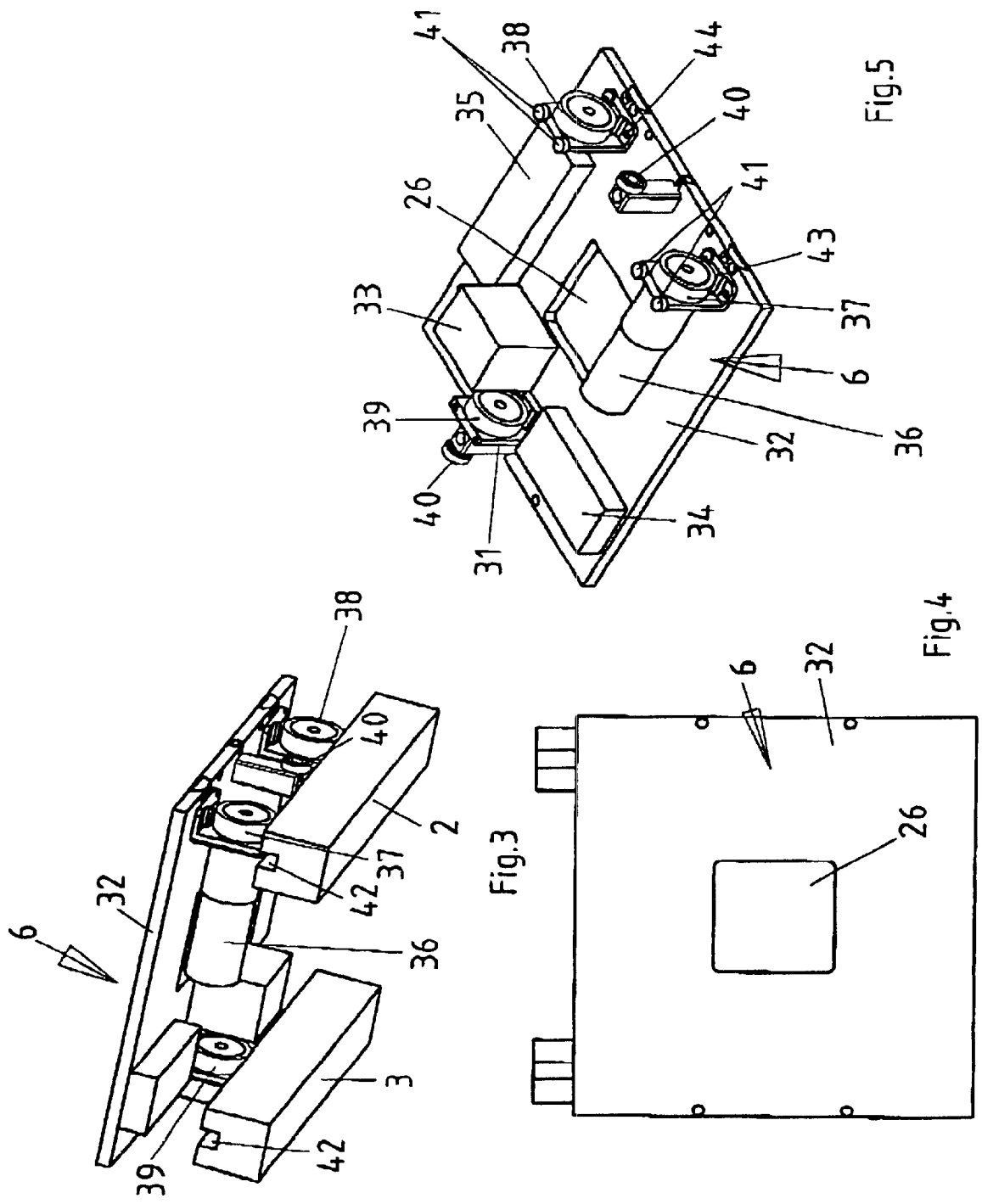

METHOD OF OPERATING A TRANSFER SYSTEM HAVING CARRIERS FOR WORK PIECES

This application is a continuation-in-part of application Ser. No. 09/400,663 filed on Sep. 20, 1999.

BACKGROUND OF THE INVENTION

The invention pertains to a method for a transfer system with workpiece carriers. Such a transfer system has, for instance, become the object of DE 195 32 281 A1. This known transfer system involves a track-guided system in which the corresponding workpiece carriers travel along the track in grooves on a plate that is constructed in a modular manner from individual plates. This known workpiece carrier features a read-write head for data transfer, with which the workpiece carrier communicates with associated individual stationary read-write heads distributed on the track. Also arranged on the known workpiece carrier are one or more distance sensors in order to permit communication of the individual workpiece carriers traveling in succession on the track. Thereby a collision of individual workpiece carriers is to be prevented, so that backed-up operation of these workpiece carriers on the transfer system is possible.

The disadvantage of the known transfer system is that the data-loading stations in the form of the known read-write heads are arranged distributed along the track, whereby an extraordinarily high programming and circuitry expense results. Such a read-write head is assigned to practically every machining station, which causes the disadvantage that the necessary information must first be fetched before each machining station, in order to communicate to the workpiece carrier what control processes are expected of it and what machining processes are to be carried out by the machining station. The known workpiece carriers have only a limited intelligence, because they are not freely programmable, that is to say, they must fetch the appropriate information and control commands before each machining station. It is not possible, for instance, to associate in advance a given travel behavior with a workpiece carrier over the entire track, not even, for instance, a given travel priority. The arrangement of read-write heads, moreover, presumes that the workpiece carrier is arranged directly opposite a stationary read-write head in order to guarantee a transfer of information at all. This is associated of course with the disadvantage that a prospective control of the workpiece carrier in conjunction with components of the transfer system is not possible. For instance, it is not possible for this workpiece carrier to prospectively trigger switches and other control elements on the track by wireless means so as to encounter a given constellation of the transfer system as it approaches. The arrangement of such read-write heads thus has the essential disadvantage that the workpiece carrier must be stopped for each information transfer in order to achieve a precisely opposite positioning of the workpiece carrier to guarantee the transfer of information. This prevents a rapid travel operation on the track and an information transfer of high information density.

The invention is thus based on the problem of refining a method for operating a transfer system with workpiece carriers, and a transfer system operating according to this method such that a separate, individual intelligence can be associated with each workpiece carrier, and thus a considerably more rapid and economical operation of the transfer system and the workpiece carriers is possible.

SUMMARY OF THE INVENTION

The core of the invention is thus that each workpiece carrier takes on information intended for it wirelessly from the data-loading station, the information is written into a microprocessor memory on the workpiece carrier, the written information, together with basic data present in the microprocessor, is converted into a travel and machining program for the workpiece carrier, and the workpiece carrier independently conditions its predetermined travel path on the basis of the travel and machining program, travels to corresponding machining stations and exchanges data with machining and/or positioning stations arranged on the path.

With the technical teaching provided, the essential advantage is achieved that a workpiece carrier is provided with completely autonomous intelligence which is fed to it from essentially one single data-loading station, preferably by wireless means. This permits an autonomous travel and machining operation for each workpiece carrier. It goes without saying that the present invention is not limited to the provision of a single data-loading station. It is possible, particularly in case of large transfer systems, for several data-loading stations to be distributed along the path. Of importance for the present invention, however, is that a data-loading station need not be associated with each individual machining station, as is presumed in DE 195 32 281 A1, but rather, information is fed to the workpiece carrier initially and essentially only one time, in the form of program and information data, which it retains across the entire transfer line system.

There is thus the advantage that, because of the retention of this information, additional data transfers need no longer take place, because the workpiece carrier is so intelligent that it can travel to all machining stations independently, or pass them by, and its intelligence also suffices to condition and prepare the travel path that it is to take. In order to process the stored data, the workpiece carrier possesses a microprocessor control unit.

Additional advantages and refinements of the invention are the objects of the dependent claims.

Thus the workpiece carrier not only controls its own travel operation with respect to defined machining stations arranged stationary along the path, it also conditions the travel path provided for it. This includes, for instance, traveling on side tracks, controlling switches to travel such side tracks and the parameterization of machining stations. This is understood to mean that it contains certain information in its control program which it passes on to the machining station or possibly that it receives information from the machining stations that is intended for it or subsequent machining stations.

As an example here, one could mention that it obtains a certain characteristic in the information acquisition from the data-loading station, for instance, that the workpiece carrier with the workpieces on it is intended only for drill machining. A "drilling" workpiece carrier of this type now conditions the machining stations it moves to, and which are responsible for it. It then informs the machining station of, for instance, the necessary drilling depth and all other machining steps that are necessary to machine the workpiece seated on it.

In the next pass, the workpiece carrier can then take on other information from the dataloading station which instruct it to supply the workpiece seated on it to certain assembly processes. It can thus be programmed individually for the machining designated for it, without having to take on any additional commands along the track.

In the same manner, the conditioning of the track with this intelligent workpiece carrier can also take place in that, during the approach of the workpiece carrier to certain track elements, a wireless signal transmission from the track elements to the workpiece carrier and back takes place in order, for instance, to reset switches or to prepare the machining station for the fact that the workpiece carrier is arriving. In this manner, the machining station is prepared for a passthrough or a stop with the associated machining operations.

With the technical teaching as presented, there results for the first time the advantage that every workpiece carrier can be set up individually for a given machining, its intelligence applying for the duration of the passage through the entire transfer system. It goes without saying that such an intelligent workpiece carrier can also pass through the transfer track system several times without having to take on new information. Thus a very rapid travel operation results, because the workpiece carrier automatically controls the manner in which it travels, based on its input intelligence, without having to take on additional intelligence from the track.

This thus yields the additional advantage that it is now possible to machine so-called individual lot sizes with one such workpiece carrier.

An additional advantage of the invention lies in the fact that the workpiece carrier is constructed to be self-teaching, that is, it has a self-teaching intelligence. After taking on the information in the data-loading station, it can occur that congestion, a fault or incorrect machining takes place in one of the machining stations to be visited in the future. The workpiece carrier now present there in the faulty machining station wirelessly reports a congestion alert along the track to the successive workpiece carriers, stating more or less that the machining station cannot be visited.

Now when a workpiece carrier situated in the data-loading station departs, it receives a congestion alert from the workpiece carrier located ahead of it and alters its travel program such that it remains on the transfer system only for a certain distance, without colliding with the workpiece carrier situated ahead of it. Then, for instance, a wait cycle is inserted, which lasts until the machining station can again be visited.

The self-teaching effect can even extend so far that, in the adoption of information in the data-loading station, it is also programmed in that a certain sequence of machining steps is not necessary. In this case, the intelligent workpiece carrier can also pass through a faulty machining station without any machining taking place, and could then travel immediately to the next machining station in order to have its additional machining steps performed there.

Another essential advantage of the invention is that no higher-level control computer for controlling the entire travel operation is necessary, because each workpiece carrier contains its own separate intelligent sequence program for itself and behaves intelligently on the track assigned to it, that is to say, it avoids congestion, it waits and it conditions the track according to its own installed program. For instance, the computer that supplies the data-loading station with the respective control program for the workpiece carrier does not know where the respective workpiece carrier currently is located on the track. Only the control unit of the workpiece carrier itself knows that, so that a considerably simpler programming effort is provided, precisely because a higher-level control computer managing the entire track is no longer necessary.

The object of the present invention results not only from the objects of the individual claims, but also from the combination of the individual claims with one another. All data and characteristics disclosed in the documents, including the abstract, in particular, the spatial configuration represented in the drawings, is claimed as essential to the invention, insofar as it is novel with respect to prior art, individually or in combination.

BRIEF DESCRIPTION OF THE DRAWINGS

The invention will be described in greater detail below on the basis of drawings representing only one mode of embodiment. In this regard, additional characteristics and advantages of the invention are seen from the drawings and the descriptions.

Shown are:

FIG. 1, a transfer system according to the invention, schematized and in a plan view;

FIG. 2, a representation of a switch of the transfer system;

FIG. 3, a workpiece carrier in use on a short section of the transfer system (viewed in perspective from below);

FIG. 4, a plan view onto the workpiece carrier of FIG. 3;

FIG. 5, a bottom view of the workpiece carrier of FIG. 3; and

DETAILED DESCRIPTION OF THE INVENTION

Figure 6:
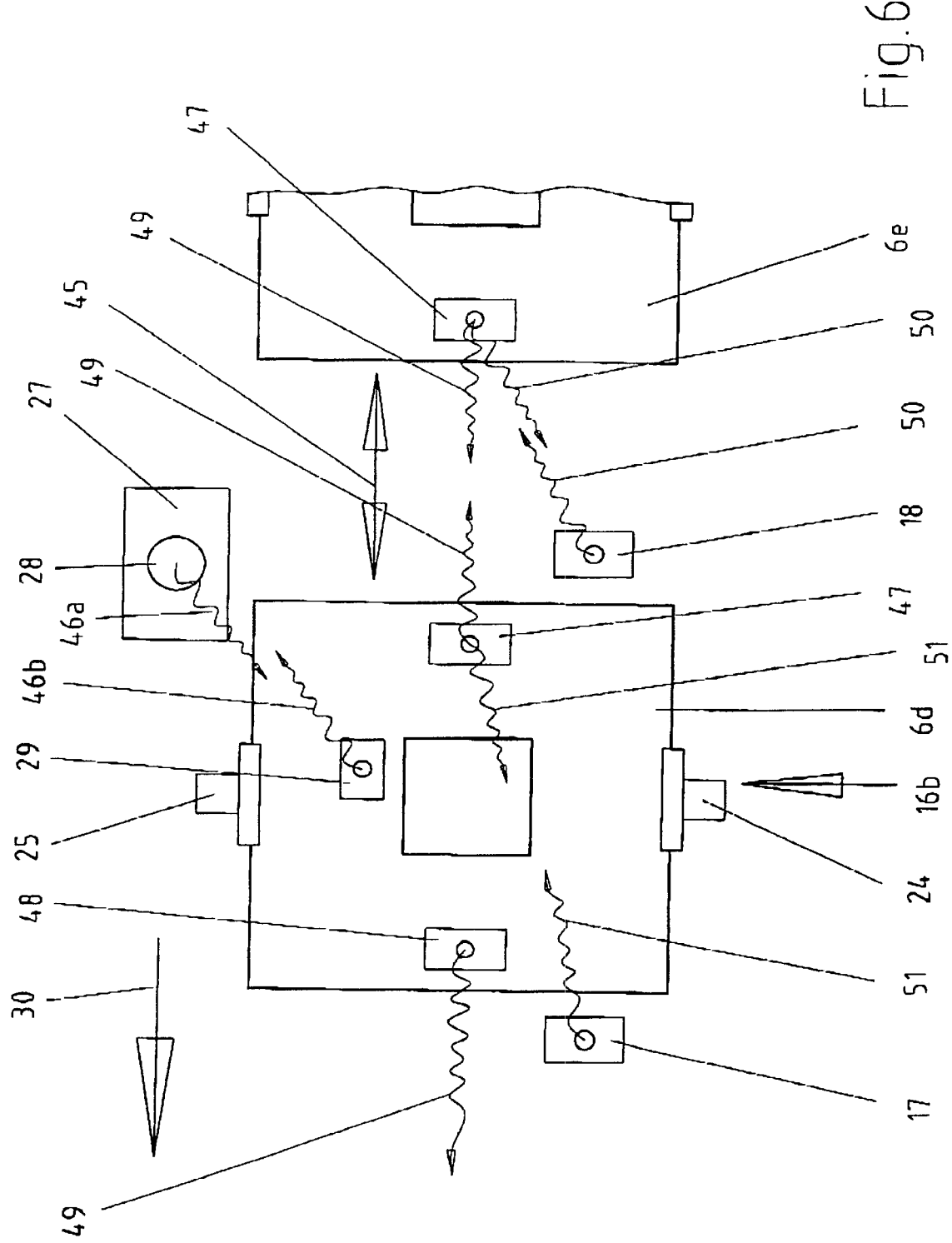
FIG. 6, the signal transmission processes between the data-loading station and between individual workpiece carriers, schematized.

The transfer system according to the invention consists of a rail system 1, which consists, in the present embodiment, of an outer rail 2 and an inner rail 3. Connecting bars 15 are also provided in the system in order to guarantee a spacing between the respective outer rail 2 and inner rail 3 that is true to gauge. It goes without saying that the invention is not limited to the proposed rail system 1; alternatively, only one rail could be present and the workpiece carrier 6 could be arranged either upright on or suspended from this rail system 1.

In the example shown, there are additionally one or more middle rails 4, 5 arranged between the outer rail 2 and the inner rail 3. The arrangement of middle rails 4, 5 has the advantage that workpiece carriers of different gauge can also travel on the transfer system.

The transfer system of FIG. 1 thus comprises a main travel track 7 formed by the rail system 1, constructed in essence as an oval rail platform, and a secondary travel track 8, which branches off from the main travel track 7 via switches 10a, 10b.

By means of the secondary travel track 8 a work station can be isolated, in which case, for instance, a hand machining station can be set up, which is subject to different accident-prevention regulations than, for instance, the automatic machining operations at the other machining stations of the workpiece carrier in the area of the main travel track 7.

According to FIGS. 1 and 2, the secondary travel tack 8 is connected to the main travel track 7 via switches 10a, 10b, where such a switch in the area of the separating inner rail 3 between main travel track 7 and secondary travel track 8 comprising a switch blade 11 driven so as to pivot on a pivot axis 14, engaging at its front end with the respective inner rail 3 and able to pivot in the direction of arrow 13 from one functional position up to an edge 12 in the other functional position. In this manner, the switch 10a can be shifted such that, in the example, the workpiece carrier 6i passes through the main travel track 7 in the direction of arrow 9. In the other functional position of the switch 10*a*, it is shifted such that the workpiece carrier, in the example the workpiece carrier 6*h*, passes through the secondary travel track 8 in the direction of arrow 9*a*. The switch 10*b* arranged on the outside is controlled correspondingly.

All together, a number of workpiece carriers 6*a*–6*h* are arranged so as to be able to move on the rail system 1, and each workpiece carrier 6 has its own intelligent control unit.

In the vicinity of the rail system 1, there are a series of machining stations, also designated as positioning stations 16, 16*a*, 16*b* below. As a rule, each machining station coincides with a positioning station. The term "positioning station" is understood to mean that in the area of this positioning station, the workpiece carrier situated there is held in place by positioning jaws 24, 25 in order to guarantee a very precise fixation of the workpiece carrier in the area of the rail system. In this manner, high-precision machining processes can be performed by machining stations, not shown in detail, on the workpieces arranged on the workpiece carrier.

Each positioning station 16, 16*a*, 16*b* is marked by input- and output-side sensors 17, 18 which control the entry and exit operations at the respective positioning station 16.

A transceiver unit 28 that communicates with a transceiver unit 29 arranged on the workpiece carrier 6*d* is arranged in the area 52 of a first data-loading station 27. The supply of data, information and programs necessary for the operation of the workpiece carrier from the data-loading station 27 to the respective workpiece carrier 6, which give the workpiece carrier an intelligence of its own, is accomplished by way of this wireless interface, implemented, for instance, by infrared transmission.

After receipt of the data, the workpiece carrier 6*d* signs off from the data-loading station 27 and makes a connection with the sensor 17, which reports to it that it has just left the area of the data-loading station 27.

By way of the associated transceiver unit 28, the data-loading station 27 sends to the transceiver unit 29 of the next workpiece carrier 6*e* a signal in such a manner as to announce that the data-loading station 27 is now free the workpiece carrier 6*e* may enter.

The workpiece carrier 6*d*, traveling out of the area 52 of the data-loading station 27 in the direction of arrow 30, is now located on the track behind a workpiece carrier 6*c* situated in front of it. The latter is in turn waiting to enter a positioning station 16, in which the workpiece carrier 6*b* is firmly positioned and is currently being subjected, for instance, to machining. The machining of the workpieces can also be accomplished, for instance, through a cutout 26 or an opening in the carrier plate 32 of the workpiece carrier (see FIG. 5).

In front of the workpiece carrier 6*b* in the direction of travel lies an additional workpiece carrier 6*a*, and in front of the latter yet another workpiece carrier 6.

Arranged on each workpiece carrier 6–6*h* there is also a transmitter 21, with which the former can condition the travel track by, for instance, making contact with various devices on the travel track. For instance, the workpiece carrier 6 makes contact with a stationary receiver 22 in the area of the switch 10*a* by way of a signal 23. The receiver 22 is coupled to a device that determines whether the main or the secondary travel track 7, 8 is to be taken and triggers the switches accordingly.

The program stored in the workpiece carrier 6 now informs the receiver 22 that the workpiece carrier is to take the secondary travel track 8. The device connected to the receiver 22 correspondingly shifts the switch blade 11 in the switch 10*a* in the direction of the secondary track.

Every workpiece carrier additionally carries a switch that interacts with stationary coding pins in the track. Thus, a switch 20 that is being actuated by a coding pin 19 arranged in the vicinity of the switch 10*a* is shown in the workpiece carrier 6. The coding pin 19 actuates the switch 20 in order to turn on the transmitter 21 only if the workpiece carrier 6 is facing a travel situation that necessitates a conditioning of the travel track. That is to say, the transceiver units on the workpiece carrier 6, and possibly even just a lone sender, transmit only if it is necessary and desired. This also serves to conserve energy. Other program sequences can also be initiated by the switch 20. For instance, coding pins 19 of this type can also be arranged in front of a curve to inform the workpiece carrier that it must reduce its speed in the curve. These are thus stationary coding devices that communicate certain information which influences its travel operation to the workpiece carrier. Of course, wireless coding devices can also be employed instead of such mechanical coding devices.

According to FIGS. 3–5, the workpiece carrier consists, in essence, of a carrier plate 32 with a central cutout 26, through which appropriate tools can extend during the machining of the workpiece in order to permit a flexible machining of the workpiece seated on the workpiece carrier.

On the bottom of the carrier plate 32 (FIG. 5), various functional units are arranged. It is immediately recognizable that this is a three-wheel workpiece carrier, with a drive motor 36 that is flanged onto a drive wheel 37 and powers the drive wheel 37. The latter is arranged on a wheel block 43 together with the drive motor 36, which wheel block 43 is seated on the rail so it can be pivoted about a vertical axis (perpendicular to the carrier plate 32) and thus steered. Another wheel block 44, which can likewise be pivoted about a vertical axis, is present for the co-rotating wheel 38.

The steering motions of these wheel blocks 43,44 are accomplished by virtue of the fact that each wheel block 43, 44 is connected to a pair of guide rollers 41, which engages in a groove 42 arranged roughly in the middle of the respective rail 2, 3.

On the opposite side, there is only a co-rotating wheel 39 arranged on a wheel block 31, which is not constructed so as to be steerable.

Also arranged on the bottom of the carrier plate 32 on corresponding blocks are outward directed positioning rollers 40, which interact with associated retaining elements in the respective positioning station 16, 16*a*, 16*b* in order to guarantee a firm fixation of the workpiece carrier in the respective positioning station.

Also present is an energy accumulator 35, which can consist of a battery or some other energy accumulator. Instead of batteries, it is preferred here to use so-called Gold-Caps, which are high-capacitance capacitors that are capable of storing a sufficient amount of energy that a continuous travel operation of up to 3 min is possible on the track. For a length of the rail system of roughly 10–15 m, such Gold-Caps suffice to guarantee passing through an entire round without the necessity of an intermediate charge.

Also present is an energy transfer unit 33 which guarantees that the energy can be transferred wirelessly from the data-loading station 27 to the energy accumulator 35. The energy transfer can take place by, for instance, inductive means.

Also present is a microprocessor 34, with which various volatile and/or nonvolatile memories can be associated.

Basic data can be programmed for each workpiece carrier in these memories, EEPROMs for instance. The microprocessor 34 then queries this EEPROM and modifies its fixed stored travel program, taking into account the data stored in the EEPROM.

A transfer of information between the data-loading station 27 and two workpiece carriers 6d and 6e arranged some distance apart will be described on the basis of FIG. 6.

The data-loading station 27 has transceiver unit 28 that is capable of carrying out the signal transmission 48a to a transceiver unit 29 on the workpiece carrier 6d. Thus the data necessary for the microprocessor 34 is programmed into the workpiece carrier 6d by way of this air interface 46a.

On the workpiece carriers 6d, 6e a transceiver unit 47 is also present, which communicates wirelessly via a signal 49 with the adjacent workpiece carrier 6e. In this way, it is assured, for example, that a certain minimum distance 45 between the workpiece carriers 6d, 6e is always maintained, by a spacing regulation taking place via the information exchange.

Arranged in a stationary position on the data-loading station 27 and on each of the positioning stations 16 is an additional sensor 18, which communicates via the signal transmission 50 to the entering workpiece carrier 6e when it is allowed to enter, that is to say, when the data-loading station 27 or the positioning station 16 is free. Every workpiece carrier also has a another transceiver unit 48, which is arranged at the front in the direction of travel and can preferably coincide with the transceiver unit 47, which guarantees a forward signal transmission 49 and communicates with the respective adjacent other workpiece carrier situated towards the front, in order again to be able to maintain the forward spacing 45 in the travel direction.

This transceiver unit 48 additionally reserves the station to be visited for itself, that is to say, the sensor 18 is appropriately addressed and then responds appropriately and either releases the station 16b for the workpiece carrier or not. Behind the station 16b in the direction of travel an additional stationary sensor is arranged with a transceiver device 17, which accomplishes the signal transmission 51 to the workpiece carrier 6d. The signal transmission 51 takes place with the transceiver unit 47 arranged on the workpiece carrier, which confirms that the workpiece carrier is permitted to leave the respective positioning station 16b and, by way of this air interface, signals are exchanged which guarantee a release the travel operation and allow the next workpiece carrier, situated behind it, to enter.

The range of the individual transceiver units is dimensioned such that essentially only the respective adjacent and associated transceiver units can be addressed, in order to avoid interference and to not have to expend any great effort to encode the signals.

Altogether, it can thus be stated that, by associating an individual intelligence, a faster and more secure travel operation is guaranteed, because the workpiece carriers can communicate with one another without the necessity of any intervention by a control computer.

Simple, individual control programs are programmed into the individual workpiece carriers with the data-loading station 27, which can take place quickly and with little effort. Thus, a high degree of flexibility for new variants is possible, that is to say reprogramming can be undertaken very quickly, because only one individual control program need be input into each individual workpiece carrier. A conditioning of the travel track, a programming of all switches and other things of this kind need not take place from a (no longer present) central control computer.

Legend to the drawings

1 Rail system
2 Outer rail
3 Inner rail
4 Middle rail
5 Middle rail
6 Workpiece carrier a-h
7 Main travel track
8 Secondary travel track
9 Direction of arrow 9a
10 Switch 10a,b
11 Switch blade
12 Edge
13 Direction of arrow
14 Pivot axis
15 Connecting bar
16 Positioning station a, b
17 Sensor
18 Sensor
19 Coding pin
20 Switch
21 Transmitter
22 Receiver
23 Direction of arrow
24 Positioning jaw
25 Positioning jaw
26 Opening
27 Data-loading station
28 Transceiver unit
29 Transceiver unit
30 Direction of arrow
31 Wheel block
32 Carrier plate
33 Energy transfer unit
34 Microprocessor
35 Energy accumulator
36 Drive motor
37 Drive motor
38 Wheel
39 Wheel
40 Positioning roller
41 Guide roller
42 Groove
43 Wheel block
44 Wheel block
45 Distance
46 Signal transmission unit 46a,b
47 Transceiver unit
48 Transceiver unit
49 Signal transmission
50 Signal transmission
51 Signal transmission
52 Area

What is claimed is:

1. A method of operating a transfer system having individual workpiece carriers driven so as to be able to travel along a path, wherein the workpiece carriers exchange information wirelessly with at least one data loading station arranged on the path, wherein a self-training sequence program is fed into the workpiece carrier in the data loading station, wherein each workpiece carrier wirelessly takes on information intended for it from the data loading station, wherein the information is written into a microprocessor control unit of the workpiece carrier, wherein, together with information present in the microprocessor, the written information is converted into a travel and machining program for the workpiece carrier, and wherein the workpiece carrier independently conditions its predetermined travel path on the basis of the travel and machining program, travels to corresponding machining stations, and exchanges data with machining or positioning stations arranged on the path.

2. The method of claim 1, wherein the workpicce carrier communicates with other devices present on the path.

3. The method of claim 1, wherein the workpiece carrier independently searches for transmitting and receiving stations present on the path, communicates with them, compares the information received with its control program and stops at the respective machining station or passes through as a function of the received signals.

4. The method of claim 1, wherein an information transfer takes place only once during the running time of the workpiece carrier.

5. The method of claim 1, wherein the workpiece carrier passes defined information on to the machining stations.

6. The method of claim 1, wherein the workpiece carrier obtains defined information from the machining stations which is intended for it, other workpiece carriers, and/or other machining stations.

7. The method of claim 1, wherein the workpiece carrier is set up individually for defined machining steps.

8. The method of claim 1, wherein the workpiece carrier communicates wirelessly with other workpiece carriers.

9. The method of claim 1, wherein initiating fixtures are arranged on the path, wherein the initiating fixtures switch corresponding switching means arranged on the workpiece camer.

10. A transfer system having individual workpiece carriers driven so as to be able to travel along a path, wherein the workpiece carriers are equipped with fixtures for writing and reading information and exchange information wirelessly with at least one data loading station arranged on the path, wherein each workpiece carrier is fed a self-training sequence program at the data loading station, and wherein each workpiece carrier has an intelligent microprocessor control system for an essentially autonomous travel and machining operation.

11. The transfer system of claim 10, wherein machining and/or positioning stations, which are equipped with transmitting and receiving units for wireless information transfer, are arranged distributed across the path.

12. The transfer system of claim 10, wherein a plurality of sensors with transmitting and receiving units are arranged in the entry and exit areas of the machining and positioning stations.

13. The transfer system of claim 10, wherein initiation fixtures configured to interact with corresponding switching means arranged on the workpiece carrier are arranged on the path.

* * * * *

UNITED STATES PATENT AND TRADEMARK OFFICE
CERTIFICATE OF CORRECTION

PATENT NO.     : 6,535,777 B1
DATED          : March 18, 2003
INVENTOR(S)    : Dietmar Kohler It is certified that error appears in the above-identified patent and that said Letters Patent is hereby corrected as shown below:

Column 9,
Line 5, which reads "workpicce", should read -- workpiece --
Line 27, which reads "camer", should read -- carrier --

Signed and Sealed this

Thirteenth Day of April, 2004

JON W. DUDAS
*Acting Director of the United States Patent and Trademark Office*